May 9, 1967 H. P. HANSEN 3,318,403
SNOW BICYCLE

Filed July 2, 1965 3 Sheets-Sheet 2

INVENTOR.
HARRY P. HANSEN
BY Lothrop & West
ATTORNEYS

United States Patent Office 3,318,403
Patented May 9, 1967

3,318,403
SNOW BICYCLE
Harry P. Hansen, 2741 Park Hills Drive,
Sacramento, Calif. 95821
Filed July 2, 1965, Ser. No. 469,200
6 Claims. (Cl. 180—5)

The invention relates to motorcycles and, more particularly, to an attachment for converting a conventional motorcycle or motorbike for use in snow and on boggy ground.

The recent years have witnessed a great increase in the use of motor driven cycles in areas remote from highways and roads. Hunters, fishermen and other recreation seekers utilize off-trail bikes to traverse rugged terrain and to reach remote areas quickly even in the absence of established trails.

Conventional bikes, however, require a rather firm support or footing and, as a result, are ordinarily unable to travel over snow, swamps and other boglands owing to the lack of traction and the tendency of the bike's wheels to sink downwardly.

It is therefore an object of the invention to provide a bicycle which is capable of crossing marshy land and fields of snow.

It is another object of the invention to provide a snow bicycle which can be readily converted from a conventional bike and, as readily, re-converted thereto.

It is a further object of the invention to provide attachments for conventional motorbikes which can be installed either at the factory or by the individual bike owner.

It is still a further object of the invention to provide a snow bike which is not only rugged, durable and reliable in use, but which is also relatively economical.

It is yet another object of the invention to provide a snow bike, the installation and operation of which can readily be learned even by an unskilled person.

It is an additional object of the invention to provide a generally improved snow bike.

Other objects, together with the forgoing are attained in the embodiment described in the following description and shown in the accompanying drawings in which.

While the snow bike of the invention is susceptible of numerous physical embodiments, depending upon the environment and requirements of use, substantial numbers of the herein shown and described embodiment have been made, tested and used under field conditions, and all have performed in an eminently satisfactory manner.

Figure 1:
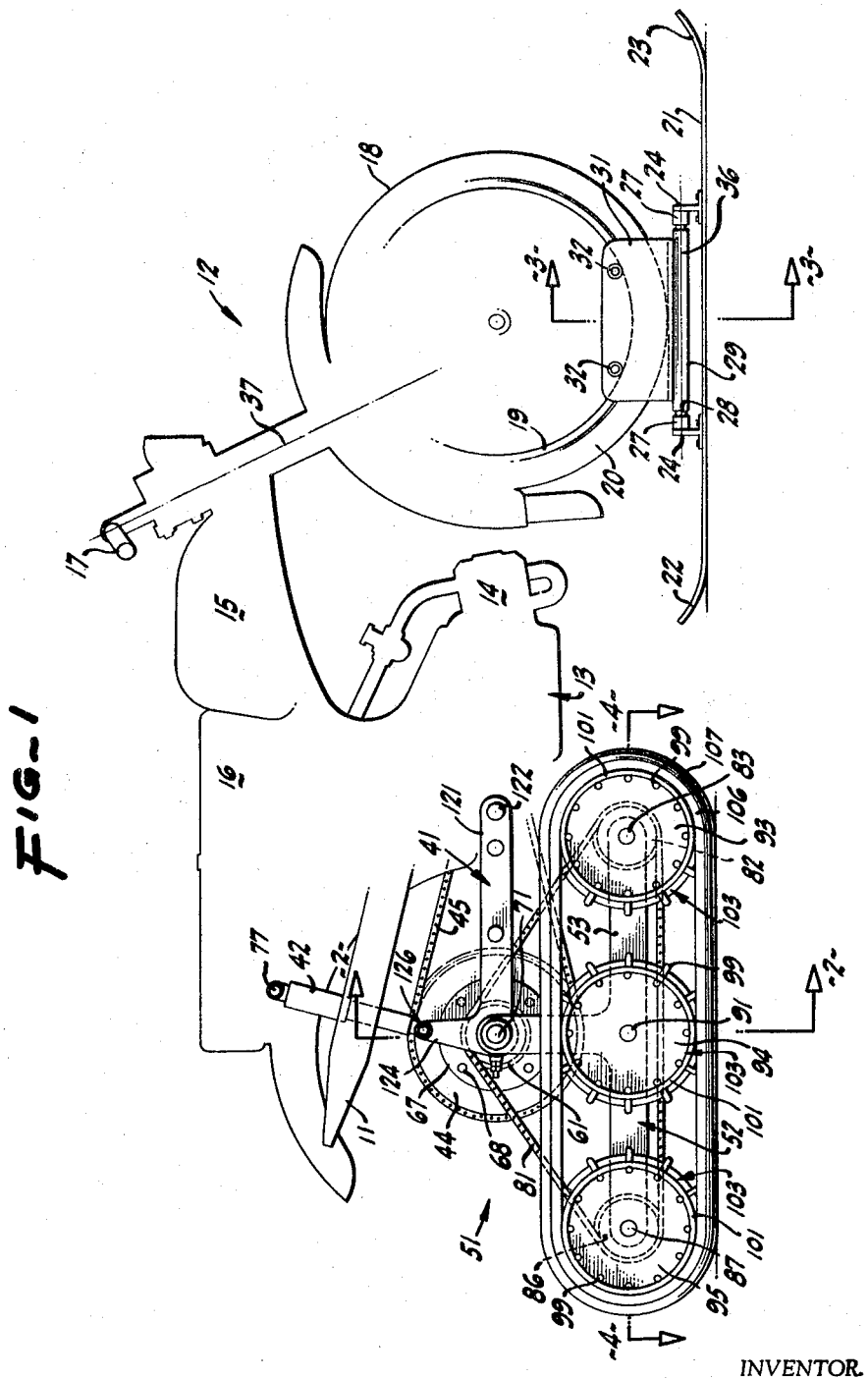
FIGURE 1 is a side elevational view of a conventional motorbike, with portions shown in outline, converted to a snow bike by the attachments of the invention.

The snow bicycle of the invention, generally designated by the reference numeral 12, includes a conventional motorcycle, shown in outline in FIGURE 1, having the customary framework 13, internal combustion engine 14, fuel tank 15, exhaust pipe 11 and seat 16.

A steering handle 17 affords control over the direction of a front wheel 18 which is provided with the usual rim 19 and pneumatic tire 20.

The weight of the vehicle, rider and load, if any, impresses a high unit pressure on the area of engagement between the tire and the supporting surface. The unit pressure is, in fact, so high as to be substantially unsupportable where the underlying surface is ordinary snow or boggy ground.

Accordingly, there is provided a pair of spaced parallel runners 21, one on each side of the wheel. The runners 21 are turned up on their after ends 22 as well as on their forward ends 23, thus forming double-ended skis.

Figure 3:
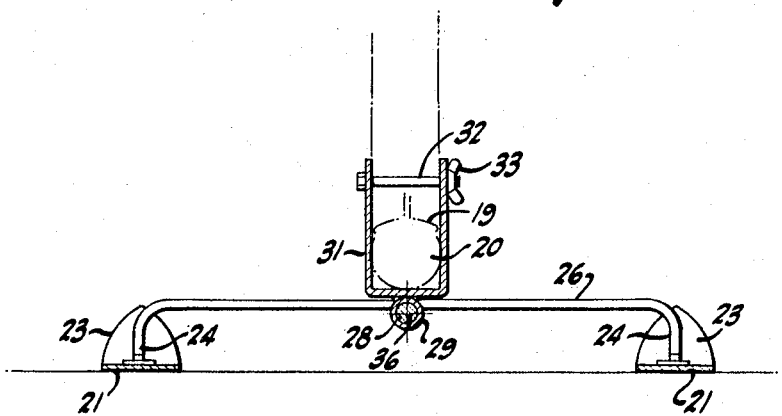
FIGURE 3 is a transverse, vertical, sectional view, to an enlarged scale, the plane of the section being indicated by the line 3—3 in FIGURE 1.

Mounting of the runners on the front wheel is effected by a pair of upstanding brackets 24 appropriately fastened to each of the runners, the forward pair of brackets and the after pair of brackets each being connected by a transverse cross bar 26 (see FIGURE 3).

The central portion of each of the cross bars 26 has mounted thereon a circular cylindrical socket 27, each socket being in registry with the other and having mounted therein a fixed shaft 28. Rotatably mounted on the fixed shaft 28 is an elongated tube 29, or sleeve, having welded on the upper side thereof an elongated, U-shaped-in-section, clamping plate member 31 within which is nestled the lower segment of the front wheel (see FIGURES 1 and 3).

A spaced pair of cross bolts 32 and wing nuts 33 extends through the spokes and clamps together the vertical walls of the U-shaped member 31 thus serving securely to confine the wheel.

While the clamping member 31 is dimensioned in FIGURES 1 and 3 to fit the rim and tire size shown, it is also to be recognized that if desired, the clamping member could be made in two separate L-shaped parts, for example, with the horizontal legs of the L-shaped parts being laterally slidable with respect to each other, and fastenable, so that the two vertical arms of the L-shaped parts could be pushed toward each other, so as tightly to clamp the wheel therebetween, followed by tightening the bolts on the horizontal arms of the L-shaped parts to secure the parts against lateral separation. This adjustable form of clamping bracket finds greatest utility among owners who have bikes with different tire sizes.

As appears most clearly in FIGURES 1 and 3, the double ended, double ski attachment on the front wheel affords freedom of lateral swinging movement of the skis about a fore and aft, horizontal axis 36, thus enabling the ski support to accommodate to side hill slopes. Furthermore, this lateral freedom of movement provides greater ease of steering, particularly where turns are made, with the handle 17 steering or turning the front wheel about the inclined turn axis 37, accompanied by the usual leaning or tilting of the bike and rider toward the direction of turn.

In the device of the invention, the conventional rear wheel (not shown) of the bike is removed, this being a readily performed operation involving only the separation of the forks 41 at the lower ends of the usual shock absorbers 42 from the wheel bearings, and the unloading of the wheel from the power sprocket 44 connected by a chain 45 to the prime mover 14.

Figure 2:
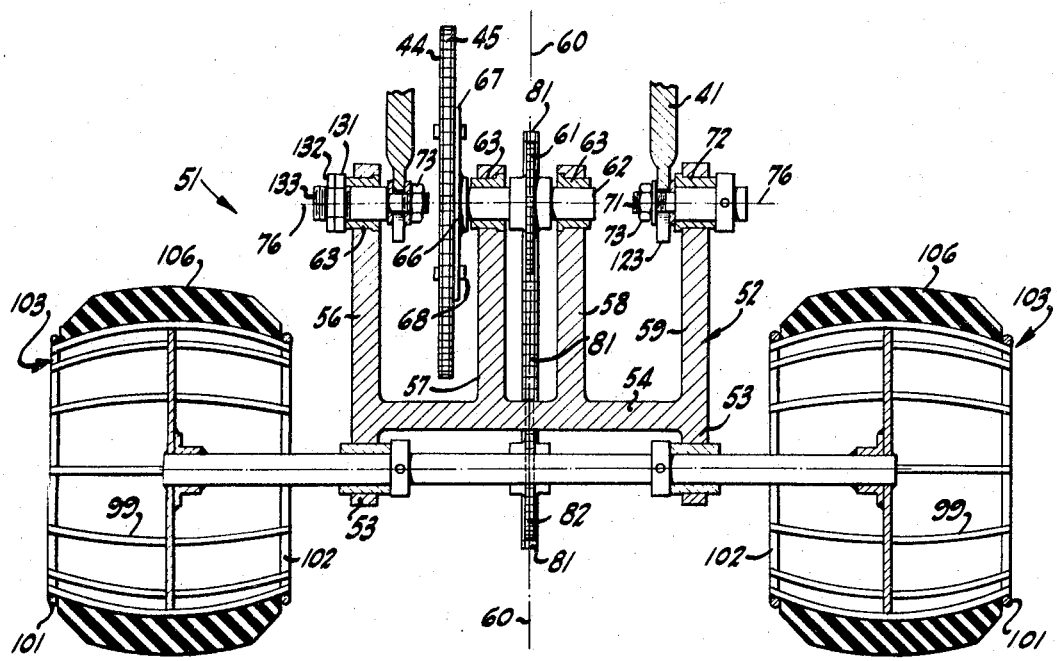
FIGURE 2 is a transverse, vertical, sectional view, to an enlarged scale, the plane of the section being indicated by the line 2—2 in FIGURE 1.
Figure 4:
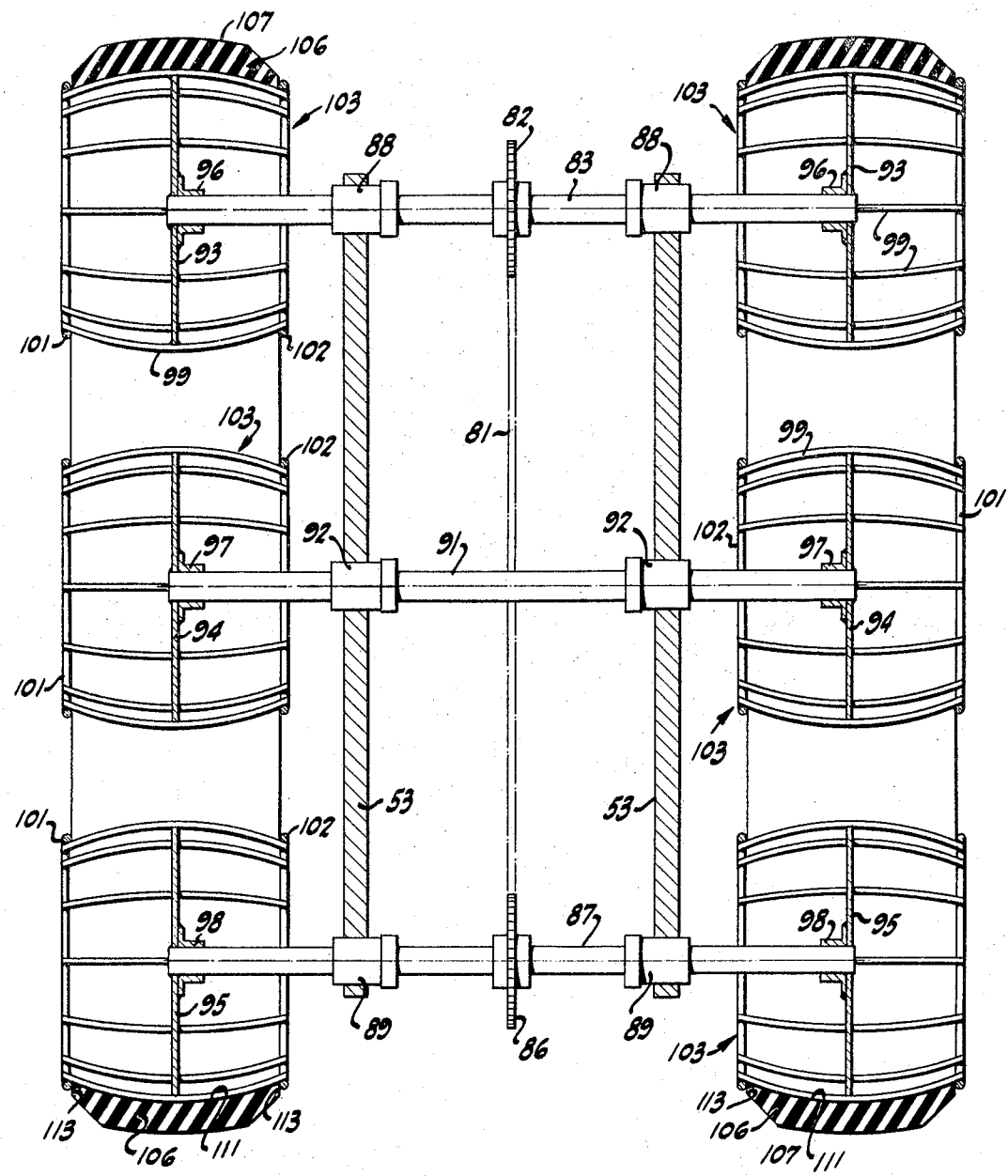
FIGURE 4 is a horizontal sectional view, to an enlarged scale, the plane of the section being indicated by the line 4—4 in FIGURE 1.

After removal of the vehicle's rear wheel, it is replaced by the rear drive assembly, generally designated by the reference numeral 51, and shown most clearly in FIGURES 1, 2, and 4.

The rear drive assembly comprises a framework 52 including a pair of horizontal, fore and aft structural members 53 with a central, transverse bracing plate 54 (see FIGURE 2) extending therebetween to provide a rigid framework, H-shaped in plan.

Upstanding from the transverse, central bracing plate 54 and the adjacent upper edges of the fore and aft members 53 is a plurality of transversely registering or aligned vertical members 56, 57, 58, and 59 (see FIGURE 2).

The upright members 56 and 57 comprise a first pair of vertical members and the uprights 58 and 59 comprise a second pair of vertical members, each of the pairs being disposed on opposite sides of a vertical median, longitudinal plane 60.

Disposed within the vertical central plane 60 is a drive sprocket 61 mounted on a drive shaft 62 journaled in a pair of bearings 63 mounted on the upper ends of the two central vertical members 57 and 58.

The drive shaft 62 is rotated by the power sprocket 44 operatively connected to the vehicle's prime mover 14 by the chain 45, as previously described.

A ready connection between the power sprocket 44 and the shaft 62 is afforded by a hub 66 suitably mounted on one end of the shaft 62, the hub 66 including a circular flange 67, or plate, having openings therein adapted to register with corresponding openings in the power sprocket 44 and being detachably connected thereto by appropriate fastenings 68.

As will be realized, the power sprocket 44 is detachably secured to the bike's rear wheel (not shown) where the ground conditions are such as to support the bike. Where, however, the bike is to be converted for use on snow, etc. by installation of the device of the invention, the rear wheel is first disconnected from the forks 41 and from the power sprocket 44. The drive assembly 51 is thereupon placed in position and the power sprocket 44 is fastened to the plate 67. The power from the prime mover is thereby transmitted through the sprocket 44 and the drive shaft 62 to the central or drive sprocket 61.

Frequently, owners of the snow bike prefer to have the sprocket 44 permanently mounted on the drive assembly. In this case, conversion to snow use is even more readily effected since it then becomes only necessary to detach the bike's rear wheel from the forks 41 and remove the power chain 45 from the rear wheel sprocket. The drive assembly 51 is then moved into position and the power chain 45 engaged with the sprocket 44 permanently mounted on the drive assembly 51. In other words, the steps of unbolting the bike's rear wheel from the bike's rear wheel sprocket, followed by bolting the sprocket to the plate 67, are thereby obviated.

The drive assembly 51 is mounted on the bike frame by securing the lower ends 123 of the forks 41, pivotally mounted on the lower ends of the shock absorbers 42, to a corresponding pair of jack shafts 71 journaled in a pair of bearings 72 mounted on the upper ends of the opposite, outermost, vertical members 56 and 59, appropriate washers and fastenings 73 being provided for this purpose.

The jack shafts 71 are mounted coaxially with the drive shaft 62, and since the jack shafts 71 are rotatable relative to the drive assembly 51, it will be seen that the entire rear drive assembly is rockable about the horizontal transverse axis 76 relative to the shock absorbers and the bike frame to which the shock absorbers are pivotally mounted, as on pins 77 (see FIGURE 1). In this fashion, the rear drive assembly is capable of rocking about the horizontal, transverse axis to accommodate to fore and aft irregularities in the terrain.

Power from the drive sprocket 61 is transmitted by a chain 81 reaved about a forward driven sprocket 82 mounted on a forward driven shaft 83, and an after driven sprocket 86 mounted on an after driven shaft 87 (see FIGURES 2 and 4). In side elevation, the chain 81 assumes the shape of an isoceles triangle (see FIGURE 1).

The driven shafts 83 and 87 are journaled in bearings 88 and 89, respectively, mounted adjacent the ends of the fore and aft members 53. In comparable fashion, a central, transverse, idler shaft 91, is provided, the idler shaft 91 being journaled in a pair of bearings 92 mounted centrally on the fore and aft members 53.

The transverse shafts 83, 91 and 87 project laterally beyond the fore and aft members 53 and terminate at their outer ends in circular plates, 93, 94 and 95, respectively, the construction being strengthened by suitable flanges 96, 97 and 98, respectively, welded thereto (see FIGURE 4).

Each of the circular plates, for example, the plate 94, has mounted thereon, as by welding, a plurality of stave members 99. The stave members 99 are bowed or arcuate and are formed of strong material, such as steel rods on the order of one-half inch in diameter.

As appears most clearly in FIGURES 2 and 4, the central portion of each of the stave rods 99 is secured to the circular plate, whereas the outer ends of the rods are welded to a circular outer hoop 101, and the inner ends are welded to a circular inner hoop 102. The construction of the wheel 103 resembles an open barrel, or basket, and it has been found that this open construction, in conjunction with the centrifugal force created by the rotation, minimizes clogging, such as by snow.

Support and tractive effort on the underlying snow is afforded by a tire 106, such as of rubber, provided with deep tread 107. The tire 106 is resiliently forced into position over the three basket-shaped wheels on opposite sides of the assembly and in installed position, assumes an elongated, or oval shape in side elevation as appears in FIGURE 1.

As will be apparent, the driven sprockets 82 and 86 on the driven shafts 83 and 87, respectively, transmit torque to the forward and rear wheels, whereas the central transverse shaft 91 and the central wheels function as idlers, the central wheels serving to support the rubber tires centrally in the span between the front and rear wheels.

As is clearly indicated in FIGURE 4, the inner surface 111 of the tire 106 is arcuate in contour and conforms to the arcuate configuration of the stave rods. As a consequence, the tread maintains a central location on the basket-like wheels in motion, in a manner similar to the centering effect of a crowned pulley on a belt. This centering effect is augmented by the lateral abutment between the lateral margin 113 of the tread against the adjacent confining circular hoop rods. Thus, despite often violent lateral thrusts against the tread, dislodgment of the tread is a very rare occurrence. However, when it is desired to replace a tread, this is readily accomplished, as, for example, by inserting a pry bar between the tread and the forward wheel and steadily urging the tread laterally with the pry bar as the wheel assembly is slowly moved forwardly.

As appears most clearly in FIGURE 1, the fork 41 is roughly T-shaped in side elevation, with the main leg 121 of the member projecting horizontally in a forward direction and being secured by appropriate fastenings 122 to the frame of the bike.

The downwardly projecting arm 123 of the fork, as previously explained, is secured to a corresponding one of the jack shafts 71 (see FIGURE 2); and the upwardly projecting arm 124 of the fork 41 (see FIGURE 1) is pivotally mounted on a pin 126 on the lower end of the shock absorber 42.

In order to adjust the jack shafts laterally with respect to the forks 41, should this be necessary in changing the assembly from one size bike to another, one of the jack shafts, for example, the left hand jack shaft in FIGURE 2, is provided with a positioning nut 131 and a lock nut 132 in threaded engagement with the enlarged, threaded left-hand end portion 133 of the jack shaft. The nut 131, as can be seen, bears against the adjacent annular shoulder of the left-hand one of the bearings 63. By loosening the nuts 131 and 132, the unthreaded central portion of the jack shaft can be shifted axially so as to position the left-hand jack shaft properly with respect to the left-hand fork, the right-hand fork having previously been mounted on the right-hand jack shaft. The nuts 131 and 132 are thereupon tightened and the mounting is completed.

It can therefore be seen that the rear drive assembly components are readily adapted to conform to bikes of differing sizes and kinds.

As a further convenience, it is also possible to provide a circular mounting plate 67 on the right-hand end (see FIGURE 2) of the drive shaft 62 so that the unit can be utilized with bikes having the power chain and power sprocket on the right-hand side of the bike rather than on the left-hand side as shown herein.

It is therefore seen that I have provided a highly versatile, yet rugged and reliable device which enables a conventional motor bike to be readily converted for use on snow and under other conditions where the surface is incapable of supporting a bike not similarly equipped.

What is claimed is:
1. A snow bicycle comprising:
 (a) a bicycle frame including a pair of shock absorbers on the after end thereof;
 (b) a front steering wheel on said frame;
 (c) adjustable ski means detachably mounted on said front wheel for supporting said front wheel in the snow;
 (d) a prime mover on said frame; and,
 (e) a rear driving assembly mounted on the after end of said frame, said driving assembly including:
  (1) a frame work having a spaced pair of horizontal fore and aft members, a first and second pair of vertical members disposed in transverse alignment adjacent the central portion of said fore and aft members;
  (2) a drive shaft journaled on the central two of said vertical members;
  (3) a power sprocket mounted on said drive shaft and operatively connected to said prime mover for rotating said drive shaft;
  (4) a pair of horizontal, transverse jack shafts journaled on the outermost two of said vertical members;
  (5) means for connecting the lower ends of said pair of shock absorbers to said pair of jack shafts;
  (6) a drive sprocket mounted on said drive shaft between said central two of said vertical members;
  (7) a plurality of transverse, horizontal driven shafts journaled on said fore and aft framework members;
  (8) a plurality of driven wheels on the outermost ends of said driven shafts;
  (9) a pair of tire treads disposed on said driven wheels; and,
  (10) sprocket means on said driven shafts and operatively connected to said drive sprocket for rotating said driven shafts and said driven wheels.
2. The device of claim 1 wherein each of said driven wheels comprises a circular central plate including a flange for securing said plate on an end of one of said driven shafts, a plurality of stave rods mounted centrally around the periphery of said central plate, and a pair of hoop rings mounted on the opposite ends of said stave rods and forming therewith an open, barrel-shaped basket each adapted to conform to the arcuate inner surfaces of said tire treads.

3. The device of claim 2 further characterized by at least one circular flange mounted axially on one end of said drive shaft, said flange including a plurality of openings in registry with the openings in said power sprocket for detachable attachment thereto.

4. The device of claim 2 further characterized by means for axially shifting at least one of said pair of jack shafts.

5. A rear wheel drive attachment for a motorcycle having a pair of mounting forks, said attachment comprising:
 (a) a generally horizontal elongated framework adapted to be mounted on said forks;
 (b) a drive shaft journaled on said framework;
 (c) a power sprocket on said drive shaft adapted to be operatively connected to the power source on said motorcycle;
 (d) at least two transverse shafts journaled on said framework;
 (e) transmission means connecting said drive shaft and at least one of said transverse shafts;
 (f) wheels on the ends of said transverse shafts, each of said wheels including a circular plate mounted centrally on an end of one of said transverse shafts, a plurality of stave rods mounted centrally around the periphery of said central plate, and a pair of hoop rings mounted on the opposite ends of said stave rods to form therewith a barrel-shaped basket; and,
 (g) a pair of endless tire treads disposed on said wheels on opposite sides of said framework.

6. The device of claim 5 further including means adapted to be mounted on the front wheel of said motorcycle for reducing the unit pressure exerted thereby on the underlying supporting surface.

References Cited by the Examiner

UNITED STATES PATENTS

| | | | |
|---|---|---|---|
| 3,077,238 | 2/1963 | Nelson | 180—5 |
| 3,101,805 | 8/1963 | Tritle | 180—9.24 |
| 3,148,743 | 9/1964 | Jarvi et al. | 180—5 |
| 3,155,436 | 11/1964 | Bonmartini | 305—34 |
| 3,252,533 | 5/1966 | Aeder et al. | 180—5 |

FOREIGN PATENTS

| | | |
|---|---|---|
| 696,937 | 11/1964 | Canada. |
| 986,197 | 3/1951 | France. |

LEO FRIAGLIA, *Primary Examiner.*